United States Patent [19]

Nespor

[11] Patent Number: 4,929,142
[45] Date of Patent: May 29, 1990

[54] VEHICLE CARRIER WITH WHEEL LIFT

[75] Inventor: Ronald R. Nespor, Sharpsville, Pa.

[73] Assignee: Chevron, Inc., Mercer, Pa.

[21] Appl. No.: 204,642

[22] Filed: Jun. 9, 1988

[51] Int. Cl.⁵ .............................................. B60P 1/04
[52] U.S. Cl. .................................... 414/563; 280/402;
  298/12; 298/22 R; 414/477; 414/480
[58] Field of Search ............... 414/477, 478, 479, 480,
  414/563; 298/12–16, 17 B; 280/402

[56] References Cited

U.S. PATENT DOCUMENTS

| 1,113,191 | 10/1914 | Breese . | |
|---|---|---|---|
| 1,858,797 | 5/1932 | Wood et al. | 298/22 R |
| 1,929,112 | 10/1933 | Hansen . | |
| 1,931,746 | 10/1933 | Allsworth et al. . | |
| 2,065,833 | 12/1936 | Stratton et al. . | |
| 2,183,478 | 12/1939 | Holmes et al. . | |
| 2,194,403 | 3/1940 | Novotney . | |
| 2,462,868 | 3/1949 | Ives . | |
| 2,468,220 | 4/1949 | McLendon . | |
| 2,509,167 | 5/1950 | Pla . | |
| 2,613,827 | 10/1952 | Van Doorne . | |
| 2,621,814 | 12/1952 | Lisota | 298/12 X |
| 2,624,484 | 1/1953 | Dalton . | |
| 2,630,929 | 3/1953 | Pearson . | |
| 2,683,545 | 7/1954 | Wood . | |
| 2,703,658 | 3/1955 | Bazzell . | |
| 2,850,187 | 9/1958 | Roberts . | |
| 3,550,801 | 12/1970 | Larson et al. | 414/480 |
| 3,667,631 | 6/1972 | Bishop . | |
| 4,222,698 | 9/1980 | Boelter | 414/477 |
| 4,318,657 | 3/1982 | Zaidaric | 414/478 |
| 4,795,303 | 1/1989 | Bubik | 414/563 X |
| 4,797,057 | 1/1989 | Shoup et al. | 414/563 |

FOREIGN PATENT DOCUMENTS

| 260213 | 5/1964 | Australia | 414/480 |
|---|---|---|---|
| 535506 | 8/1928 | Fed. Rep. of Germany | 298/22 |

Primary Examiner—Frank E. Werner
Attorney, Agent, or Firm—Buchanan Ingersoll

[57] ABSTRACT

A subframe structure for a tilting bed vehicle carrier. The subframe structure has an attached wheel lift and the subframe is pivotally mounted on the chassis of a towing vehicle. The subframe structure includes pivotally mounted strut members for load distribution within the subframe. The load which is distributed by the strut members tends to counteract the bending and torsion forces imposed upon the subframe structure by the towed vehicle on the rear wheel lift.

15 Claims, 3 Drawing Sheets

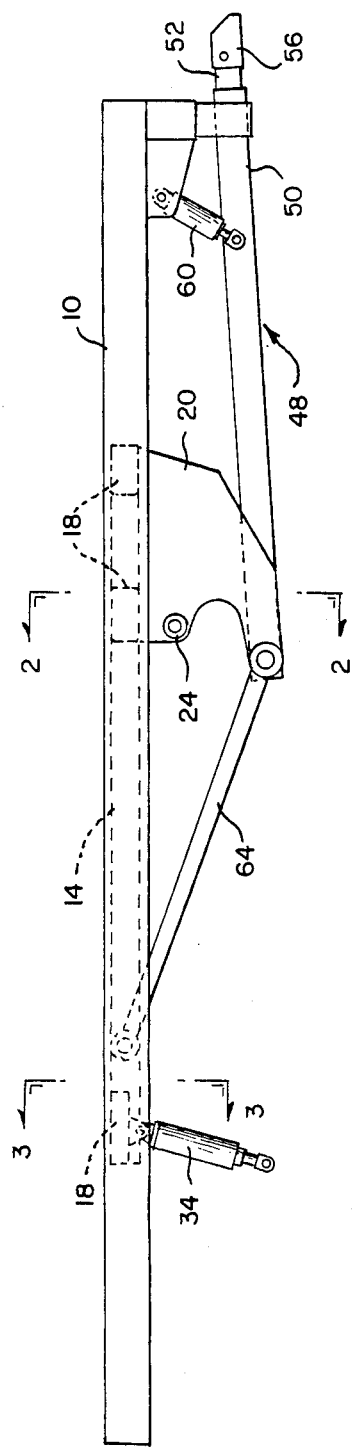

VEHICLE CARRIER WITH WHEEL LIFT

This invention relates to a combination tilting bed vehicle carrier and attached wheel lift for mounting on a towing vehicle.

More particularly, this invention relates to a subframe structure for a tilting bed carrier which includes strut members for load distribution within the subframe. The load which is distributed by the strut members tends to counteract the bending and torsion forces imposed on the subframe structure by the towed vehicle carried by the rear wheel lift. The subframe bending forces are primarily due to the weight of the vehicle on the wheel lift and the subframe torsion forces arise due to unevenness or holes in the road which can cause one side of the vehicle in the wheel lift to ride at a higher level than the other, imparting a twisting force to the subframe structure.

More particularly, this invention relates to a combination tilting bed carrier and attached wheel lift apparatus for mounting on the chassis of a towing vehicle. The tilting bed carrier comprises first and second elongated beams for supporting a sliding tilting bed platform. The beams each have a forward end relatively near the cab of the towing vehicle and a rearward end relatively remote from the cab of the towing vehicle. Brace means secure the parallel beams in a spaced apart parallel relationship.

First bracket means are secured to and extend downwardly from the first beam. Second bracket means are secured to and extend downwardly from the second beam. The first and the second bracket means depend from similar longitudinal positions on the beams. First chassis pivot means is used for pivotally securing the first bracket to the chassis. Second chassis pivot means is used for pivotally securing the second bracket to the chassis.

The wheel lift is positioned below the beams. The wheel lift includes swingable telescopic tube means. The rearward end of the telescopic tube means extends rearwardly of the tilting bed carrier for lifting the wheels of a towed vehicle. Tube pivot means supported by the first and second brackets is provided for pivotally mounting the front end of the telescopic tube means so that the telescopic tube means is swingable thereon.

First strut means is provided having a forward end and a rearward end. Second strut means is also provided having a forward end and a rearward end. The forward end of the first strut means is fixedly secured to the first beam at a position on the first beam forwardly of the first bracket and the rearward end of the first strut is mounted on a first strut pivot supported by the first and second brackets. The forward end of the second strut is secured to the second beam at a position on the second beam forwardly of the second bracket and the rearward end of the second strut is mounted on a second strut pivot supported by the first and second brackets.

Motive means is attached to the tilting bed carrier forwardly of the strut means to tilt the bed upwardly at its forward end while pivoting about the first and second chassis pivot means.

The apparatus can employ an axle extending between and supported by the first and second brackets. The first strut pivot can comprise first collar means secured to the rearward end of the first strut means and mounted around the axle for pivoting the first strut means on the axle. The second strut pivot can comprise second collar means secured to the rearward end of the second strut means and mounted around the axle for pivoting the second strut means on the axle. If desired, third collar means can be secured to the forward end of the telescopic tube means and mounted about the axle to comprise the tube pivot means.

In the apparatus, the first and second bracket means are located to the rear of the rear wheels on the chassis and the forward ends of the first and second strut means are fixedly secured to the first and second beams, respectively, at a position on the beams forwardly of the rear wheels.

This invention will be more clearly understood by reference to the accompanying figures in which FIG. 1 is a side view of the subframe structure of the tilting bed carrier;

FIG. 2 is a view taken through the section 2—2 of FIG. 1;

Figure 5:
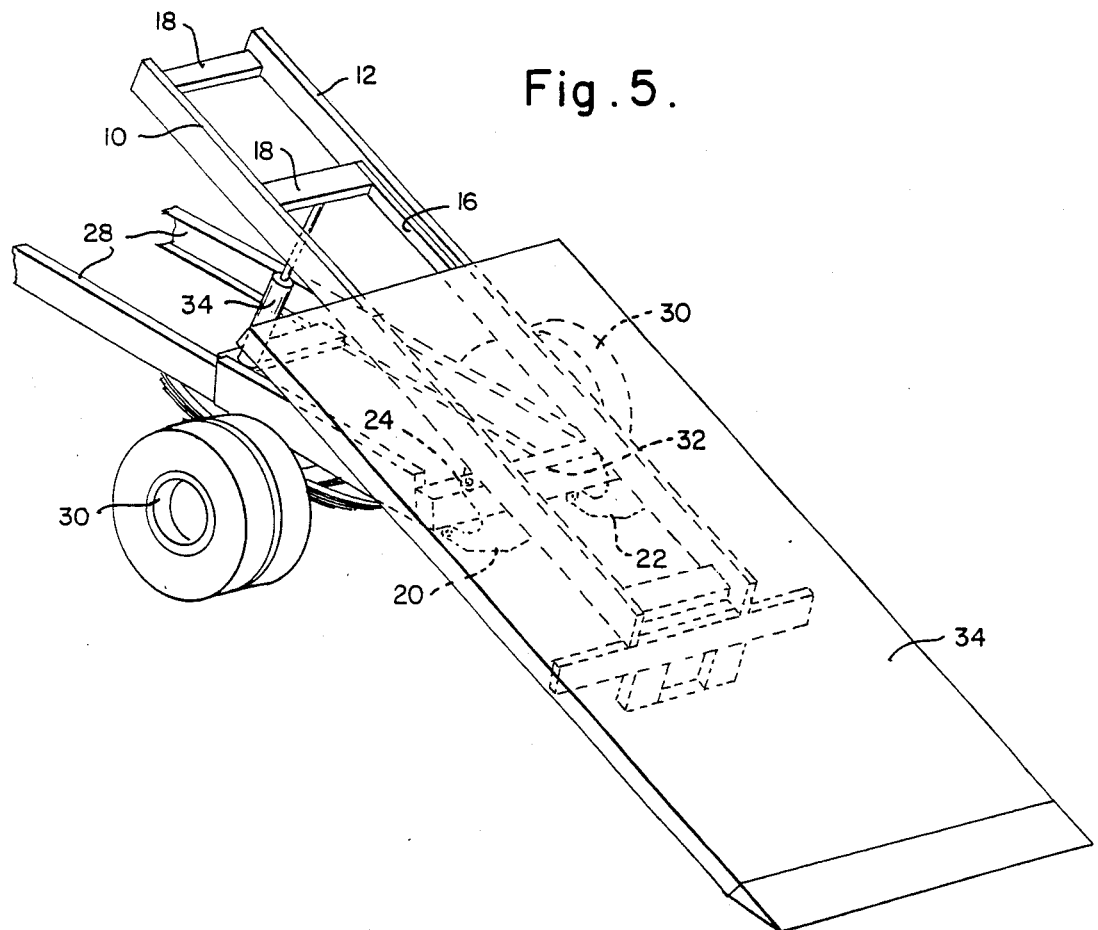
FIG. 5 is an isometric view of the subframe structure attached to a vehicle chassis and in tilted position.

Referring to the drawings, the subframe comprises first and second parallel longitudinal steel beams 10 and 12. Beams 10 and 12 are provided with integral internal reinforcing bars 14 and 16. Reinforcing bars 14 and 16 are optional and can be employed if required. Beams 10 and 12 are maintained in parallel spaced-apart relationship by means of a plurality of braces 18.

First bracket means 20 is secured at an interior surface of beam 10 or reinforcing bar 14 and extends downwardly from beam 10. Second bracket means 22 is secured at an interior surface of beam 12 or reinforcing bar 16 and extends downwardly from beam 12. Bracket 20 is provided with pivot means 24 and bracket 22 is provided with pivot means 26. Pivot means 24 and 26 serve to pivot the subframe assembly to chassis member 32 of a towing vehicle, as shown in FIG. 5.

Referring to FIG. 5, a towing vehicle having chassis frame members 28 and 32 with a set of vehicle rear wheels 30 is provided with a tiltable subframe comprising parallel beams 10 and 12 and a series of braces 18. Beams 10 and 12 are provided with depending brackets 20 and 22, respectively. Each beam is pivoted on the chassis frame. Beam 10 is pivoted on chassis member 32 at pivot 24, shown in FIGS. 2, 4 and 5, and beam 12 is similarly pivoted to chassis member 32 at pivot 26, shown in FIG. 2 but hidden in FIGS. 4 and 5. Pivots 24 and 26 are mounted on the chassis at a position to the rear of wheels 30.

Hydraulic jack 34 can be mounted between a member of the chassis frame and a member of the subframe, as shown in FIG. 5, to tilt the subframe upwardly at its forward end. It will be understood that more than one hydraulic jack can be employed.

Thereupon, platform 34 can be forced to slide downwardly to ground level to receive a vehicle to be carried on the platform. After the carried vehicle is driven onto the platform, hydraulic jack 34 is retracted, allowing the subframe and platform with vehicle to resume a horizontal position. Thereupon, the platform with vehicle can be pulled forwardly toward the cab, not shown, at the front of the towing vehicle by means of any device, such as a winch, not shown.

Figure 3:
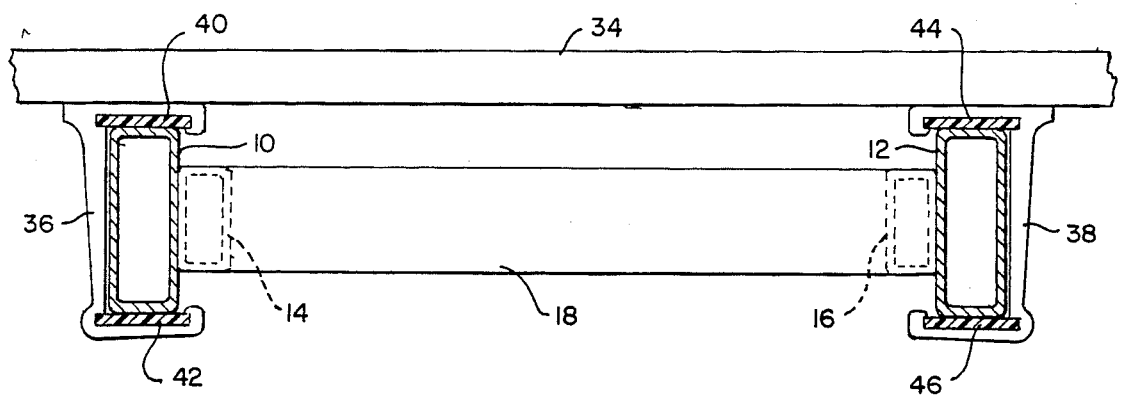
FIG. 3 is a view taken through the section 3—3 of FIG. 1 with sliding platform added.

FIG. 3 shows that the underside of platform 34 is provided with a pair of guide members 36 and 38 which partially enclose subframe beams 10 and 12, respectively. Guide member 36 is provided with internal upper and lower plastic strips 40 and 42 and guide member 38 is provided with internal upper and lower plastic strips 44 and 46. The plastic strips are low friction members which allow platform 34 to slide back and forth on beams 10 and 12.

Wheel lift assembly 48 is mounted at the rear of and below subframe beams 10 and 12. The wheel lift assembly comprises extendable and retractable telescoping tube members 50 and 52. At the rearward end of member 52 is mounted laterally extending expandable sleeve assembly 54. Laterally extending sleeve assembly 54 has a pair of end shoes 56 and 58 to receive wheel cradle means, not shown, for lifting the wheels of a towed automotive vehicle. The connector arm assembly in shoes 56 and 58 is shown in my patent application entitled Quick Couple L-Bar Sleeve Assembly For Wheel Lift; Serial No. 204,454, filed on the same date as the present application.

Figure 4:
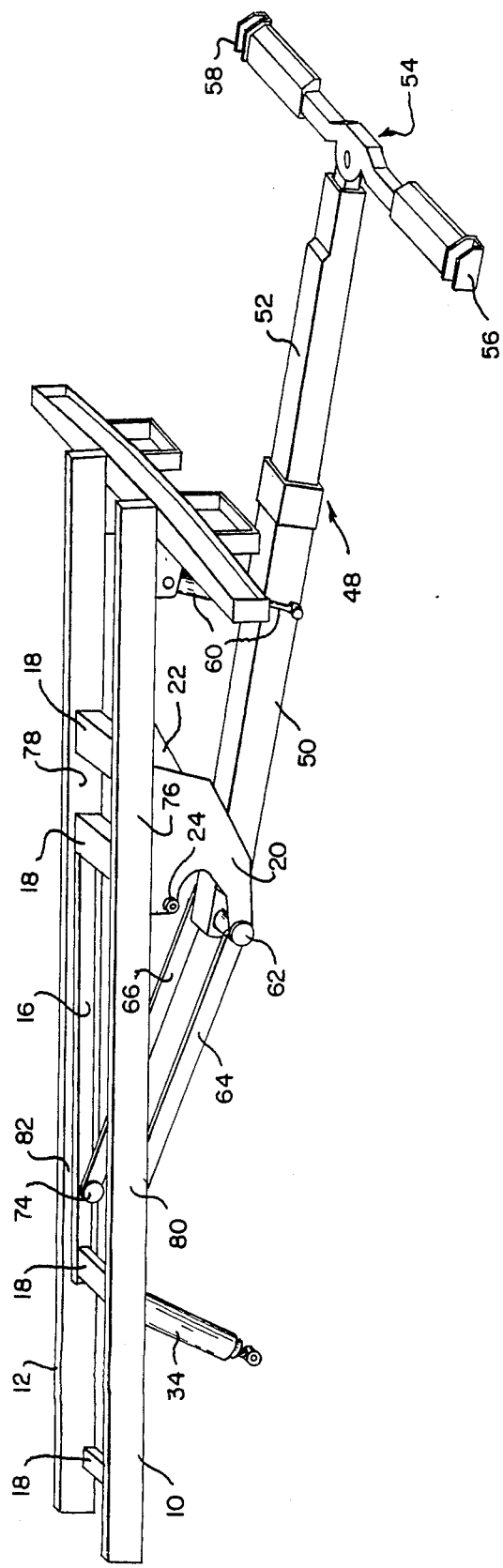
FIG. 4 is an isometric view of the subframe structure with attached wheel lift.

Wheel lift assembly 48 is swung upwardly and downwardly in a vertical arc by means of hydraulic motor 60. FIG. 2 shows a cross-section of the rear of wheel lift tube 50 provided with side openings, not shown, so that tube 50 is swingably pivoted centrally on axle 62 which is mounted between brackets 20 and 22 As shown in FIGS. 2 and 4, first strut 64 and second strut 66 each have one end pivoted on axle 62 and the other end fixedly secured to a subframe beam. As shown in FIG. 2, first strut 64 is pivoted at its lower end on axle 62 by means of collar 68 and is fixedly secured at its upper end to reinforcing bar 14 by means of boss 70. Second strut 66 is pivoted at its lower end on axle 62 by means of collar 72 and is fixedly secured at its upper end to reinforcing bar 16 by means of boss 74. Struts 64 and 66 are pivoted on opposite ends of axle 62, respectively.

As is shown in co-filed application Serial Number 204,454 wheel lift 48 is adapted to lift two wheels of a towed vehicle. This will result in a downward force on brackets 20 and 22 and on beams 10 and 12 at the similar longitudinal positions 76 and 78 on beams 10 and 12 corresponding to the locations of brackets 20 and 22, respectively. The localized downward force at positions 76 and 78, shown in FIG. 4, tends to induce localized bending in beams 10 and 12 at positions 76 and 78. The use of struts 64 and 66 distributes a portion of the downward force of the towed vehicle to positions 80 and 82 on beams 10 and 12, respectively, thereby tending to distribute the downward load away from positions 76 and 78 and to reduce the bending stress at positions 76 and 78.

Struts 64 and 66 also tend to reduce torsion stress tending to occur at beams 10 and 12. During towing of the vehicle carried on wheel lift 48, prevailing road conditions, such as a pothole or a sidewardly sloping roadway, will tend to induce twisting stresses at positions 76 and 78 on beams 10 and 12, tending to distort the beams. However, struts 64 and 66 tend to distribute the twisting stresses from positions 76 and 78 to positions 80 and 82 on beams 10 and 12, thereby avoiding excessive localized twisting stresses.

I claim:

1. A combination tilting bed carrier and attached wheel lift apparatus for mounting on the chassis of a towing vehicle comprising,
   a tilting bed platform,
   a tilting bed including first and second elongated beams for supporting said tilting bed platform,
   said beams each having a forward end relatively near the cab of said towing vehicle and a rearward end relatively remote from the cab of said towing vehicle,
   brace means for securing said beams in a spaced apart parallel relationship,
   first bracket means secured to and extending downwardly from said first beam,
   second bracket means secured to and extending downwardly from said second beam,
   said first bracket means and said second bracket means depending from similar longitudinal positions on said beams,
   first chassis pivot means for pivotally securing said first bracket to said chassis,
   second chassis pivot means for pivotally securing said second bracket to said chassis,
   a wheel lift including a front end and a rearward end, said rearward end extending rearwardly from beneath said tilting bed for lifting the wheels of a towed vehicle,
   pivot means supported by said first and second brackets for pivotally mounting said front end of said wheel lift,
   motive means mounted on said wheel lift for actuating pivotal movement thereoff about said pivot means,
   first strut means having a forward end and a rearward end,
   second strut means having a forward end and a rearward end,
   the forward end of said first strut means secured to said first beam at a position on said first beam forwardly of said first bracket and the rearward end of said first strut means supported by said first bracket,
   the forward end of said second strut means secured to said second beam at a position on said second beam forwardly of said second bracket and the rearward end of said second strut means supported by said first bracket, and
   said first and second strut means being operable to transfer stresses applied to said wheel lift from said first and second brackets along the length of said first and second strut means to said first and second beams respectively at a point thereon forwardly of said first and second brackets.

2. The apparatus of claim 1 including an axle extending between and supported by said first and second bracket means, first collar means around said axle, said first collar means secured to the rearward end of said first strut means and comprising said first strut pivot, and second collar means around said axle, said second collar means secured to the rearward end of said second strut means and comprising said second strut pivot.

3. The apparatus of claim 2 including third collar means on said axle, said third collar means secured to the forward end of said telescopic tube means and comprising said tube pivot means for pivoting said telescopic tube means on said axle.

4. The apparatus of claim 3 wherein said third collar means is located at a mid position on said axle and said first and second collar means re located on opposite sides of said third collar means.

5. The apparatus of claim 1 including a platform having guide means for slidably receiving said first and second elongated beams to permit said platform to slide back and forth on said first and second elongated beams.

6. The apparatus of claim 1 wherein said wheel lift includes a pair of wheel cradle means at the rearward end of telescopic tube means for receiving the wheels of a towed vehicle.

7. The apparatus of claim 1 including rear wheels on said chassis and said first and said second bracket means located to the rear of said rear wheels.

8. The apparatus of claim 7 wherein said first and said second strut means are secured to said first and said second beams, respectively, at a position on said beams forward of said rear wheels.

9. A tilting bed carrier apparatus comprising,
 a vehicle chassis formed by a pair of parallel spaced longitudinally extending frame members,
 a set of wheels connected to said frame members for movement of said vehicle chassis,
 a tilting bed including first and second elongated beams,
 said beams each having a forward end to be located relatively near the cab of a towing vehicle and a rearward end to be located relatively remote from the cab of the towing vehicle.
 brace means for securing said parallel beams in a space apart parallel relationship,
 first bracket means secured to an extending downwardly from said first beam,
 second bracket means secured to and extending downwardly from said second beam,
 said first bracket means and said second bracket means depending from similar longitudinal positions on said beams,
 said fist bracket means pivotally secured to said chassis on the side of said chassis relatively near said first beam,
 said second bracket means pivotally secured to said chassis on the side of said chassis relatively near said second beam,
 first strut means having a forward end and a rearward end,
 second strut means having a forward end and a rearward end,
 the forward end of said firs strut means secured to said first beam at a position on said first beam forwardly of said first bracket and the rearward end of said first strut means supported by said first bracket,
 the forward end of said second strut means secured to said second beam at a position on said second beam forwardly of said second bracket and the rearward end of said second strut means supported by said second bracket, and
 telescopic wheel lift means for lifting the wheels of a towed vehicle, said telescopic wheel lift means pivotally attached to said first and second bracket means and extending rearwardly of said tilting bed.

10. The apparatus of claim 9 wherein said first strut pivot and said second strut pivot are each supported by said first and second brackets.

11. The apparatus of claim 9 which includes hydraulic cylinder means connected to said tilting bed and mounted on said vehicle chassis for actuating pivotal movement of said tilting bed.

12. The apparatus of claim 9 including a platform slidably mounted on said elongated beams.

13. The apparatus of claim 9 including motive means mounted on said wheel lift means for actuating pivotal movement thereof about said first and second bracket means.

14. The apparatus of claim 13 wherein said wheel lift means includes swingable telescopic tube means, and said first and second bracket means adapted to pivotally support the rearward end of said tube means.

15. The apparatus of claim 9 wherein said first and said second beams are mounted on said chassis so that said first and said second bracket means are located to the rear of the wheels on said chassis and so that the positions where said first and said second strut means are secured to said first and said second beams, respectively, are forwardly of said wheels.

* * * * *

UNITED STATES PATENT AND TRADEMARK OFFICE
CERTIFICATE OF CORRECTION

PATENT NO. : 4,929,142

DATED : May 29, 1990

INVENTOR(S) : RONALD R. NESPOR

It is certified that error appears in the above-identified patent and that said Letters Patent is hereby corrected as shown below:

Column 4, line 63, claim 4, change "re" to --are--.

Column 6, line 3, claim 9, change "firs" to --first--.

Signed and Sealed this

Sixth Day of August, 1991

Attest:

HARRY F. MANBECK, JR.

Attesting Officer

Commissioner of Patents and Trademarks